US012342115B2

(12) United States Patent
Kobayashi et al.

(10) Patent No.: US 12,342,115 B2
(45) Date of Patent: Jun. 24, 2025

(54) REPRODUCTION APPARATUS, METHOD AND PROGRAM FOR THE SAME

(71) Applicant: NIPPON TELEGRAPH AND TELEPHONE CORPORATION, Tokyo (JP)

(72) Inventors: Kazunori Kobayashi, Tokyo (JP); Ryotaro Sato, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 185 days.

(21) Appl. No.: 17/913,421

(22) PCT Filed: Apr. 1, 2020

(86) PCT No.: PCT/JP2020/015055
§ 371 (c)(1),
(2) Date: Sep. 21, 2022

(87) PCT Pub. No.: WO2021/199382
PCT Pub. Date: Oct. 7, 2021

(65) Prior Publication Data
US 2023/0108565 A1 Apr. 6, 2023

(51) Int. Cl.
*H04R 1/02* (2006.01)
*H04R 5/02* (2006.01)

(52) U.S. Cl.
CPC ............... *H04R 1/025* (2013.01); *H04R 5/02* (2013.01)

(58) Field of Classification Search
CPC . H04R 5/02; H04R 5/023; H04R 1/20; H04R 1/32; H04R 1/323; H04R 1/403; H04R 2499/13
See application file for complete search history.

(56) References Cited

U.S. PATENT DOCUMENTS 8,090,116 B2 1/2012 Holmi et al.
2020/0374631 A1 11/2020 Hayashi et al.
2021/0021932 A1* 1/2021 Frost .................. B60R 11/0217

FOREIGN PATENT DOCUMENTS

JP 2007143164 A 6/2007
JP 2009219101 A 9/2009
(Continued)

OTHER PUBLICATIONS

Honda Motor Co. "Sky Sound Speaker System" [online] Accessed on Mar. 17, 2020] website: <URL: https://www.honda.co.jp/ACCESS/s660/special/skysound/> with English translation generated by computer.

*Primary Examiner* — Kile O Blair

(57) ABSTRACT

A reproduction apparatus that realizes reproduction of which sound leakage is small with use of a speaker installed near a head, and a method and a program thereof are provided. The reproduction apparatus is used in a seat. The reproduction apparatus includes: at least two speakers; an acquisition unit that acquires, from a predetermined sound source, an acoustic signal of which sound is emitted by the reproduction apparatus; and a control unit that controls the acoustic signal acquired by the acquisition unit such that reproduction sound is only transmitted to a first seat and the reproduction sound is not transmitted to a second seat, the speakers each emit sound of the acoustic signal controlled by the control unit, and the speakers are disposed so as to be closer to an ear of a user that sits in the first seat than to the second seat.

3 Claims, 13 Drawing Sheets

(56) References Cited

FOREIGN PATENT DOCUMENTS

| | | | |
|---|---|---|---|
| JP | 2010171513 | A | 8/2010 |
| WO | 2019139103 | A1 | 7/2019 |

* cited by examiner

REPRODUCTION APPARATUS, METHOD AND PROGRAM FOR THE SAME

CROSS-REFERENCE TO RELATED APPLICATIONS

This application is a U.S. National Stage Application filed under 35 U.S.C. § 371 claiming priority to International Patent Application No. PCT/JP2020/015055, filed on 1 Apr. 2020, the disclosure of which is hereby incorporated herein by reference in its entirety.

TECHNICAL FIELD

The present invention relates to a technology of reproduction of sound by a speaker.

BACKGROUND ART

When an acoustic signal is reproduced by a speaker installed in an automobile, it may be difficult for a user sitting in a seat to hear the reproduction sound due to wind noise, engine noise, traveling noise, and the like. Non-Patent Literature 1 is known as a related-art technology that realizes reproduction sound that is easy to hear for a user by reproducing an acoustic signal by a speaker installed in a headrest of a seat of an automobile, for example.

CITATION LIST

Non-Patent Literature

Non-Patent Literature 1: "Sky Sound Speaker System", [online], Honda Motor Co., [searched on Mar. 17, 2020], the Internet <URL: https://www.honda.co.jp/ACCESS/s660/special/skysound/>

SUMMARY OF THE INVENTION

Technical Problem

However, in the case of Non-Patent Literature 1, the reproduction sound may leak to a seat other than the seat in which the user is sitting. For example, when the reproduction of an instruction voice (for example, "please turn to the right at the next intersection") of a navigation system or a hands-free call sound is performed for a driver and music or the sound of a movie is reproduced in the other seat, it is preferred that the instruction voice of the navigation system and the hands-free call sound reproduced in the driver's seat be not heard in the other seat. However, when a normal speaker such as that in Non-Patent Literature 1 is used, a problem in that the sound leaks to the other seat and it becomes difficult to hear the sound desired to be heard in the seat occurs.

An object of the present invention is to provide a reproduction apparatus that realizes reproduction of which sound leakage is small with use of a speaker installed in a place near a head, and a method and a program thereof.

Means for Solving the Problem

In order to solve the abovementioned problem, according to one aspect of the present invention, a reproduction apparatus is used in a seat. The reproduction apparatus includes: at least two speakers; an acquisition unit that acquires, from a predetermined sound source, an acoustic signal of which sound is emitted by the reproduction apparatus; and a control unit that controls the acoustic signal acquired by the acquisition unit such that reproduction sound is only transmitted to a first seat and the reproduction sound is not transmitted to a second seat, the speakers each emit sound of the acoustic signal controlled by the control unit, and the speakers are disposed so as to be closer to an ear of a user that sits in the first seat than to the second seat.

Effects of the Invention

According to the present invention, the effect in which the sound leakage is reduced is exhibited.

DESCRIPTION OF EMBODIMENTS

Figure 1:
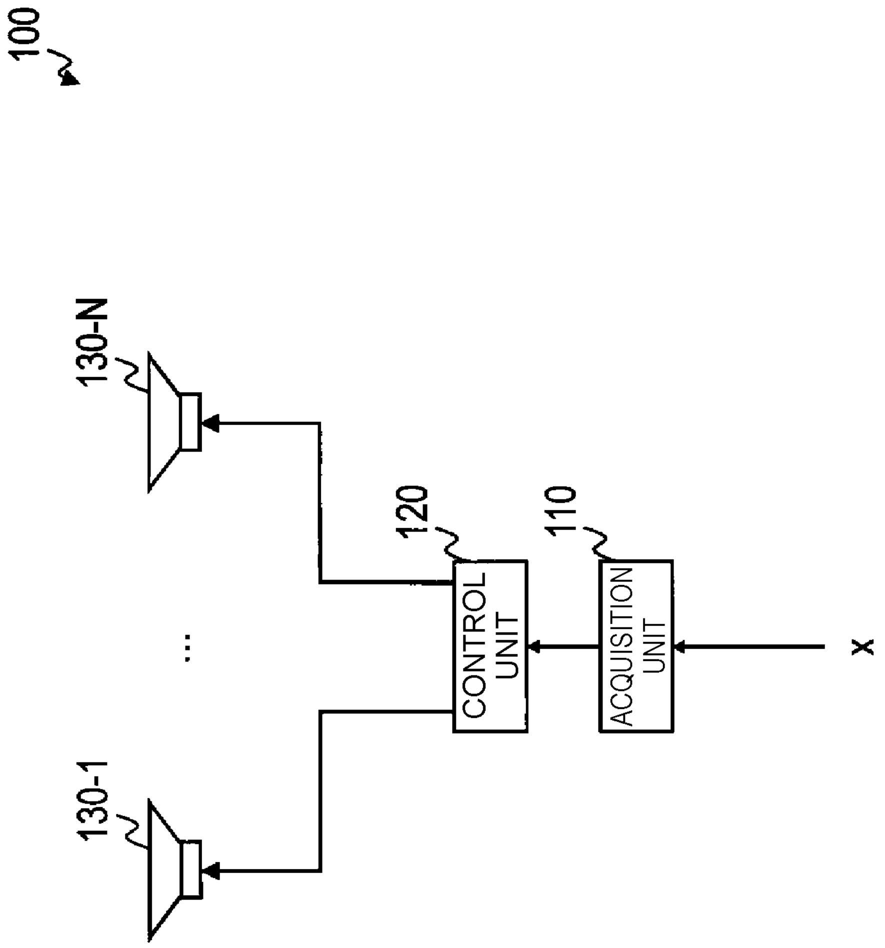
FIG. 1 is a functional block diagram of a reproduction apparatus according to a first embodiment.

An embodiment of the present invention is described below. In the drawings used in the description below, configuration units having the same functions and steps for performing the same processing are denoted by the same characters, and overlapping description thereof is omitted. In the description below, processing performed in units of elements of vectors and matrices is applied to all of the elements of those vectors and matrices unless otherwise noted.

First Embodiment

Figure 2:
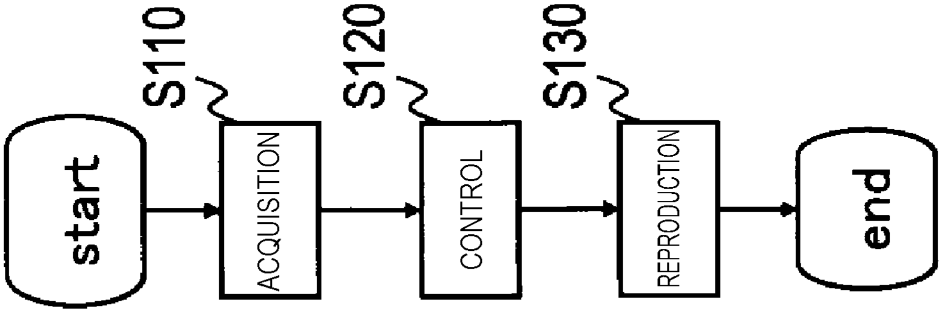
FIG. 2 is a diagram illustrating an example of a processing flow of the reproduction apparatus according to the first embodiment.

FIG. 1 is a functional block diagram of a reproduction apparatus according to a first embodiment, and FIG. 2 illustrates a processing flow thereof.

A reproduction apparatus 100 includes an acquisition unit 110, a control unit 120, and a number of N speakers 130-*n*. Here, N is any integer equal to or more than 2, and n=1, 2, . . . , N is satisfied.

The reproduction apparatus 100 acquires an acoustic signal x via the acquisition unit 110, performs predetermined signal processing on the acoustic signal x acquired in the control unit 120, and reproduces the signal after the signal processing by the number of N speakers 130-*n*.

The reproduction apparatus (hereinafter also referred to as a "signal processing device") excluding the number of N speakers 130-*n* is a special device configured by causing a special program to be read in a well-known or a dedicated computer having a central processing unit (CPU), a main storage device (RAM: random access memory), and the like, for example. The signal processing device executes each processing under the control of the central processing unit, for example. Data input to the signal processing device and data acquired in each processing are stored in the main storage device, for example, and the data stored in the main storage device is used in other processing by being read out to the central processing unit as needed. At least a part of each processing unit of the signal processing device may be configured by hardware such as an integrated circuit. Each of storage units included in the signal processing device can be configured by a main storage device such as a random access memory (RAM) or middleware such as a key-value store and a relational database, for example. Each of the storage units does not necessarily need to be included in the signal processing device on the inside thereof and may be configured by an auxiliary storage device configured by a hard disk, an optical disc, or a semiconductor memory element such as a flash memory and may be included on the outside of the signal processing device.

Each unit is described below.

<Number of N Speakers 130-*n*>

The speakers 130-*n* emit sound of an acoustic signal controlled by the control unit 120 described below (S130). The number of N speakers 130-*n* are disposed so as to be closer to the ear of a user sitting in a first seat than to a second seat. The first seat is a seat in which the user (listener) is sitting, and the second seat is a seat in which a passenger other than the user is sitting. For example, at least two speakers 130-*n* are disposed such that the position of either one of the ears of the user (listener) sitting in the first seat and the center of each of at least two speakers 130-*n* are arranged on one straight line. The speakers 130-*n* may be attached to the front surface of a backrest or a headrest of the seat or may be embedded therein. The speakers may be attached to or embedded in a ceiling, a wall surface, or the like. In short, the abovementioned positional relationship only needs to be satisfied.

FIG. 3 to FIG. 6 illustrate examples of the arrangement of the number of N speakers 130-*n* of the present embodiment. Here, N is any integer equal to or more than 2, and the center of the speaker means the center of a portion that emits sound (a portion that vibrates) and is the center of a cone when the speakers 130-*n* are cone speakers, for example. At least two speakers 130-*n* are disposed such that the position of either one of the ears of the listener is on an extension line of a straight line passing through the centers of at least two speakers 130-*n*.

Figure 3:
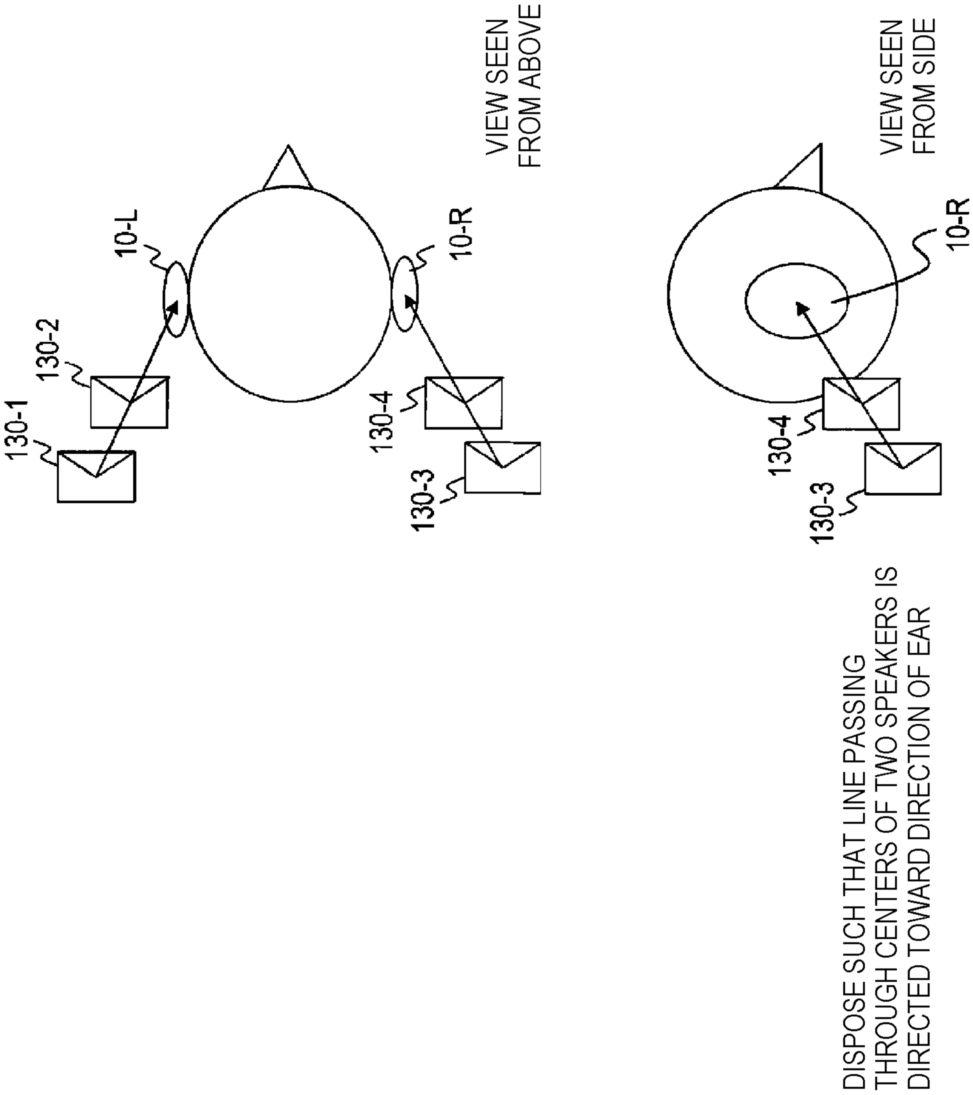
FIG. 3 is a view illustrating an example of the arrangement of speakers of the first embodiment.

In FIG. 3, four speakers 130-1 to 130-4 are disposed. The two speakers 130-1 and 130-2 are disposed such that the position of an ear 10-L of the listener is on an extension line of a straight line passing through the centers of the two speakers 130-1 and 130-2. The two speakers 130-3 and 130-4 are disposed such that the position of an ear 10-R of the listener is on an extension line of a straight line passing through the centers of two speakers 130-3 and 130-4.

Figure 4:
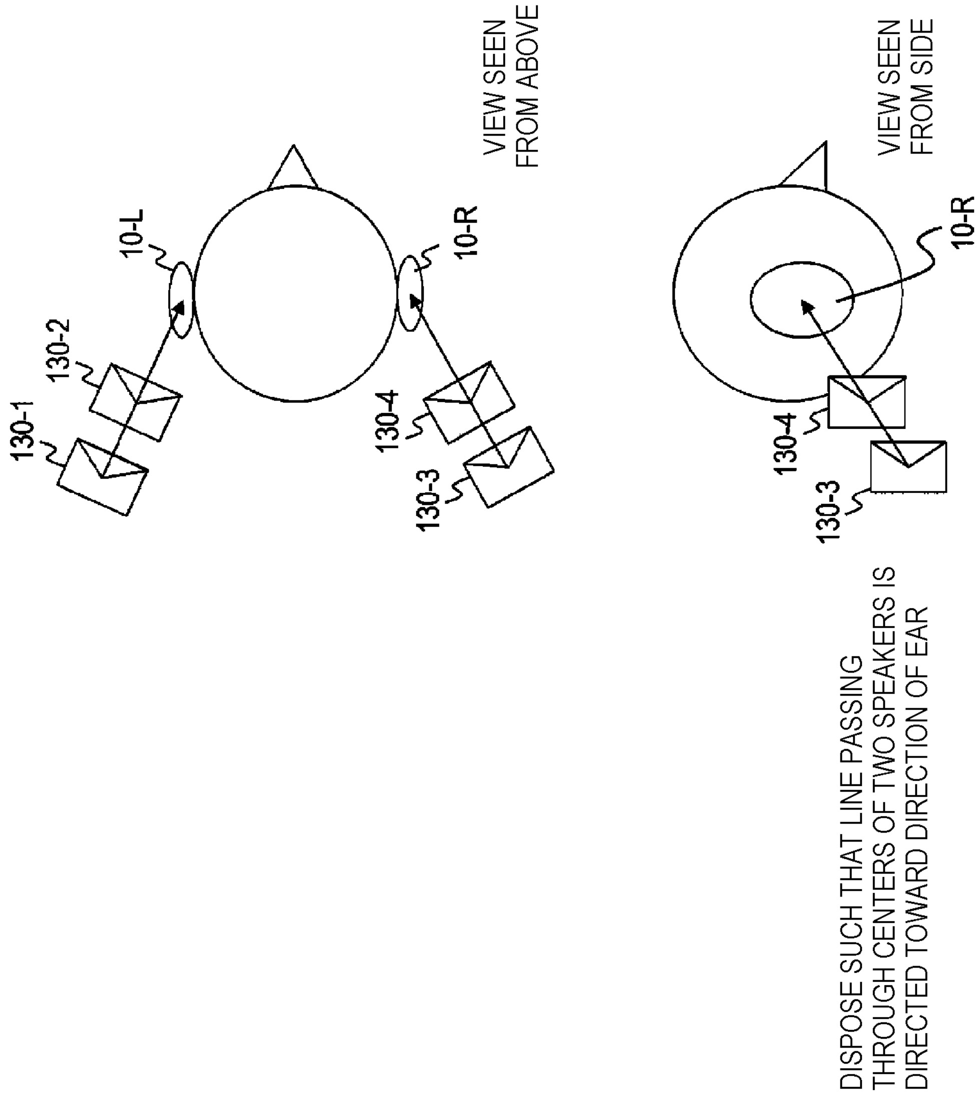
FIG. 4 is a view illustrating an example of the arrangement of the speakers of the first embodiment.

In FIG. 4, the arrangement of the four speakers 130-1 to 130-4 is the same as that in FIG. 3, and the orientations of the four speakers 130-1 to 130-4 are different from those in FIG. 3. In FIG. 3, the four speakers 130-1 to 130-4 are disposed so as to face the same direction as the direction that the listener is facing. In FIG. 4, the two speakers 130-1 and 130-2 face the direction of the ear 10-L of the listener, and the two speakers 130-3 and 130-4 are disposed so as to face the direction of the ear 10-R of the listener.

Figure 5:
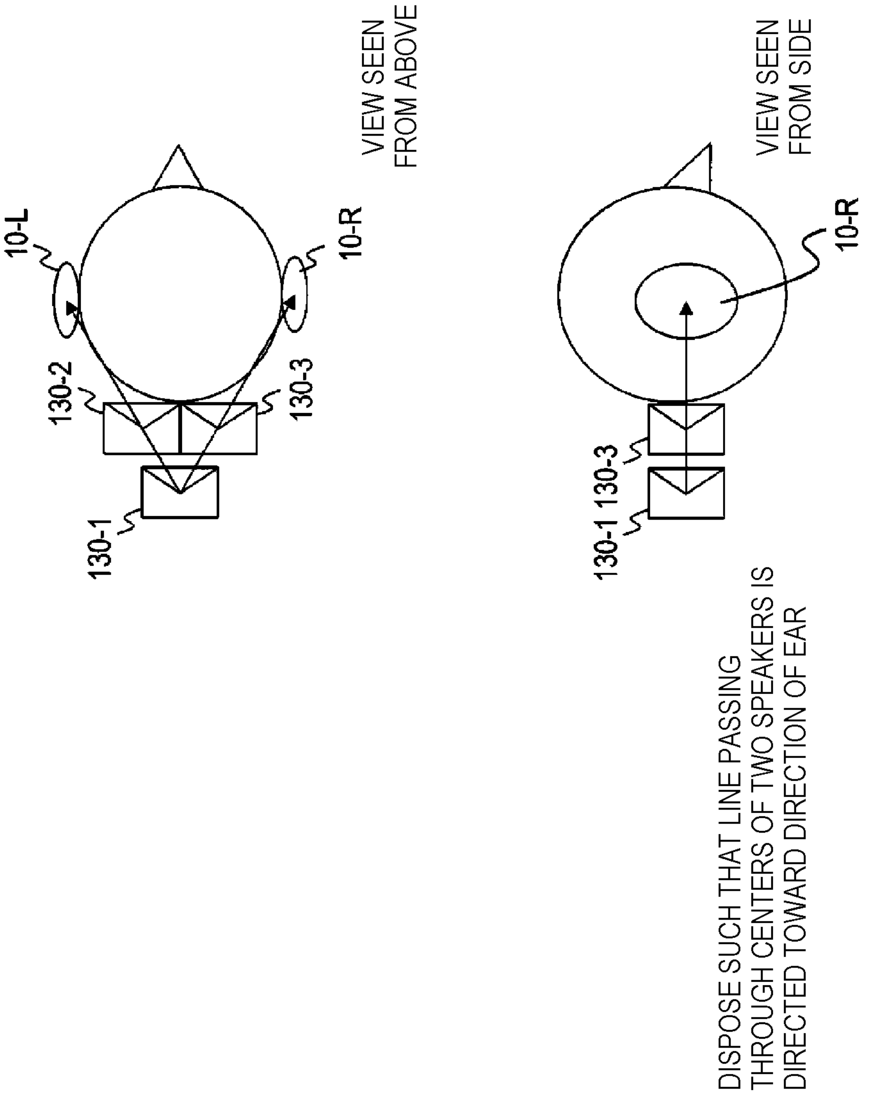
FIG. 5 is a view illustrating an example of the arrangement of the speakers of the first embodiment.

In FIG. 5, three speakers 130-1 to 130-3 are disposed. The two speakers 130-1 and 130-2 are disposed such that the position of the ear 10-L of the listener is on an extension line of a straight line passing through the centers of the two speakers 130-1 and 130-2. The two speakers 130-1 and 130-3 are disposed such that the position of the ear 10-R of the listener is on an extension line of a straight line passing through the centers of two speakers 130-1 and 130-3.

Figure 6:
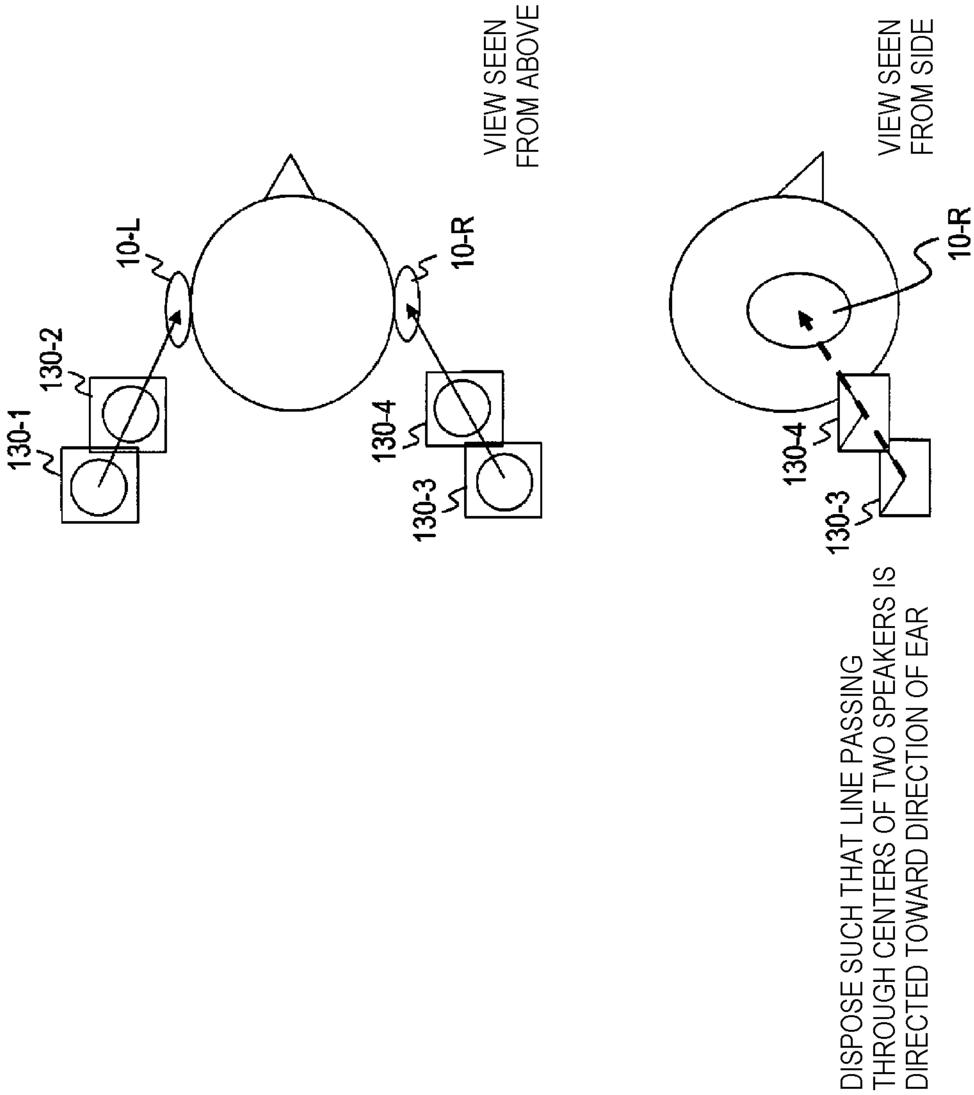
FIG. 6 is a view illustrating an example of the arrangement of the speakers of the first embodiment.

In FIG. 6, the arrangement of the four speakers 130-1 to 130-4 is the same as that in FIG. 3, and the orientations of the four speakers 130-1 to 130-4 are different from those in FIG. 3. In FIG. 6, the four speakers 130-1 to 130-4 are disposed so as to face the upper direction.

<Acquisition Unit 110>

The acquisition unit 110 acquires, from a predetermined sound source, the acoustic signal x of which sound is emitted by the reproduction apparatus 100 (S110), and outputs the acoustic signal x to the control unit 120. The acquisition unit 110 is a reading unit capable of acquiring an acoustic signal recorded in a recording medium (predetermined sound source) readable by a computer, a communication unit that can acquire an acoustic signal recorded in another computer (predetermined sound source) over a network, or an input unit into which an acoustic signal obtained by collecting sound emitted from a predetermined sound source by a sound collection device such as a microphone is input, for example.

<Control Unit 120>

The acoustic signal x is input to the control unit 120, and the control unit 120 controls the acoustic signal x such that the reproduction sound is only transmitted to the first seat and the reproduction sound is not transmitted to the second seat (S120).

Figure 7:
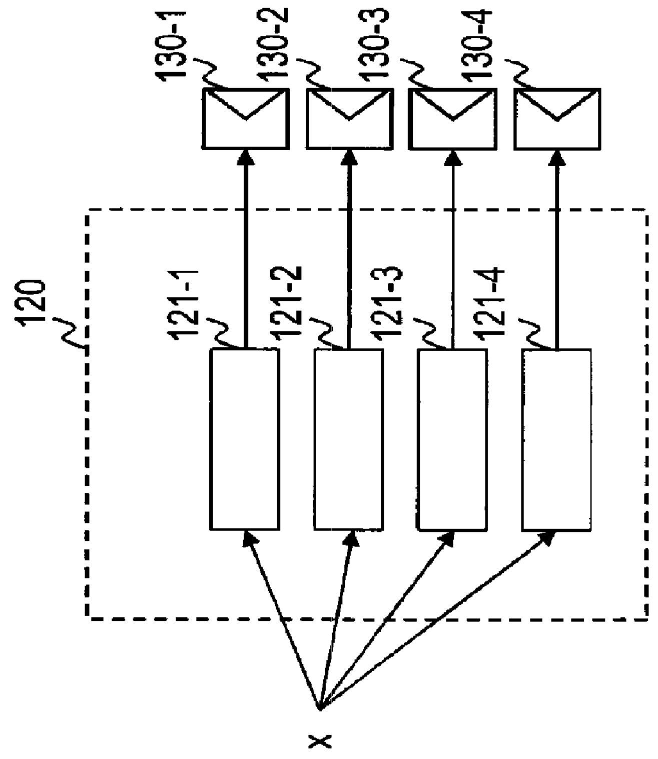
FIG. 7 is a functional block diagram of a control unit according to the first embodiment.

For example, as illustrated in FIG. 7, the control unit 120 includes a number of N FIR filters 121-*n*. The control unit 120 filters the acoustic signal x (the input signal of the speakers 130-*n*) by the number of N FIR filters 121-*n* such that directional characteristics synthesized in the number of N speakers 130-*n* become stronger toward the direction of the ears 10-L and 10-R, and outputs a number of N acoustic signals after the filtering to the corresponding speakers 130-*n*, respectively.

Figure 8:
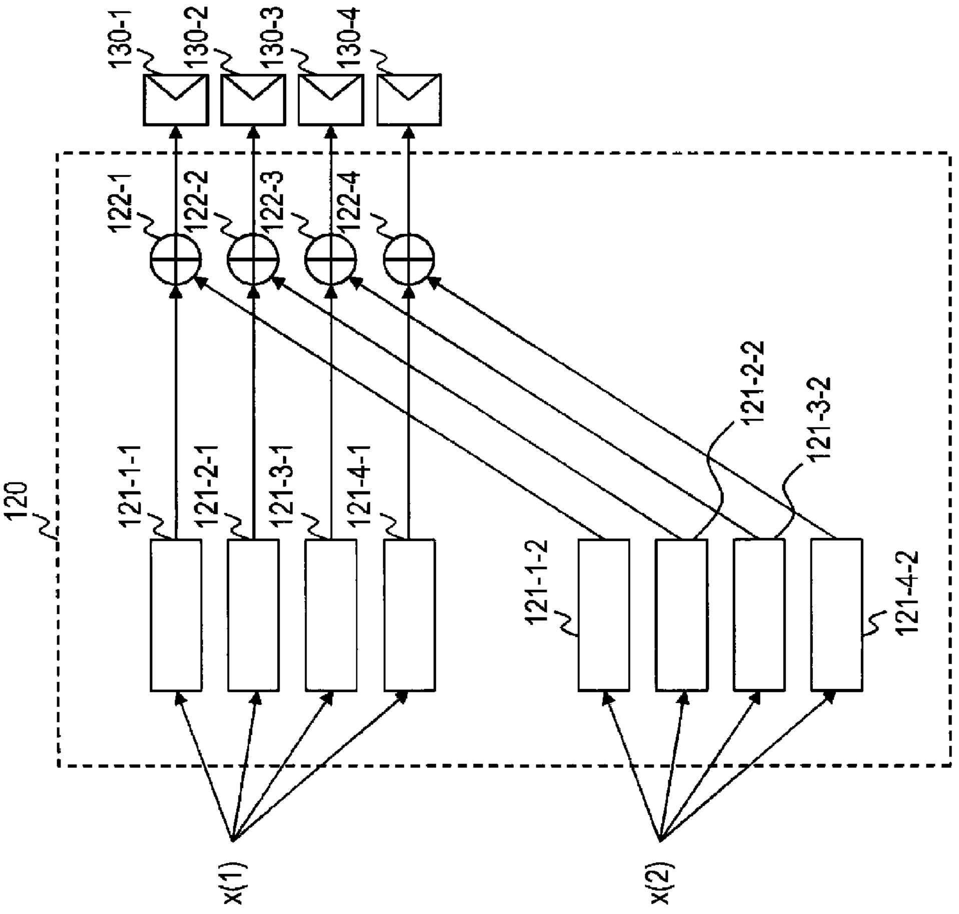
FIG. 8 is a functional block diagram of the control unit according to the first embodiment.

For example, when the acoustic signal x is in a stereo channel or channels equal to or more than the stereo channel, the control unit 120 includes a number of N×M FIR filters 121-*n*-*m* and a number of N addition units 122-*n* as illustrated in FIG. 8, where M represents the number of channels of the acoustic signal x, m=1, 2, . . . , M is satisfied, the acoustic signal of the m-th channel is represented by x(m), and x=[x(1), x(2), . . . , x(M)] is satisfied. The control unit 120 filters the acoustic signal x (the input signal of the speakers 130-*n*) by the number of N×M FIR filters 121-*n*-*m* such that directional characteristics synthesized in the number of N speakers 130-*n* become stronger toward the direction of the ears 10-L and 10-R. A number of M acoustic signals after filtering are input to the addition units 122-*n*, and the addition units 122-*n* perform addition of the number of M acoustic signals and output the number of M acoustic signals to the corresponding speakers 130-*n*.

Figure 9:
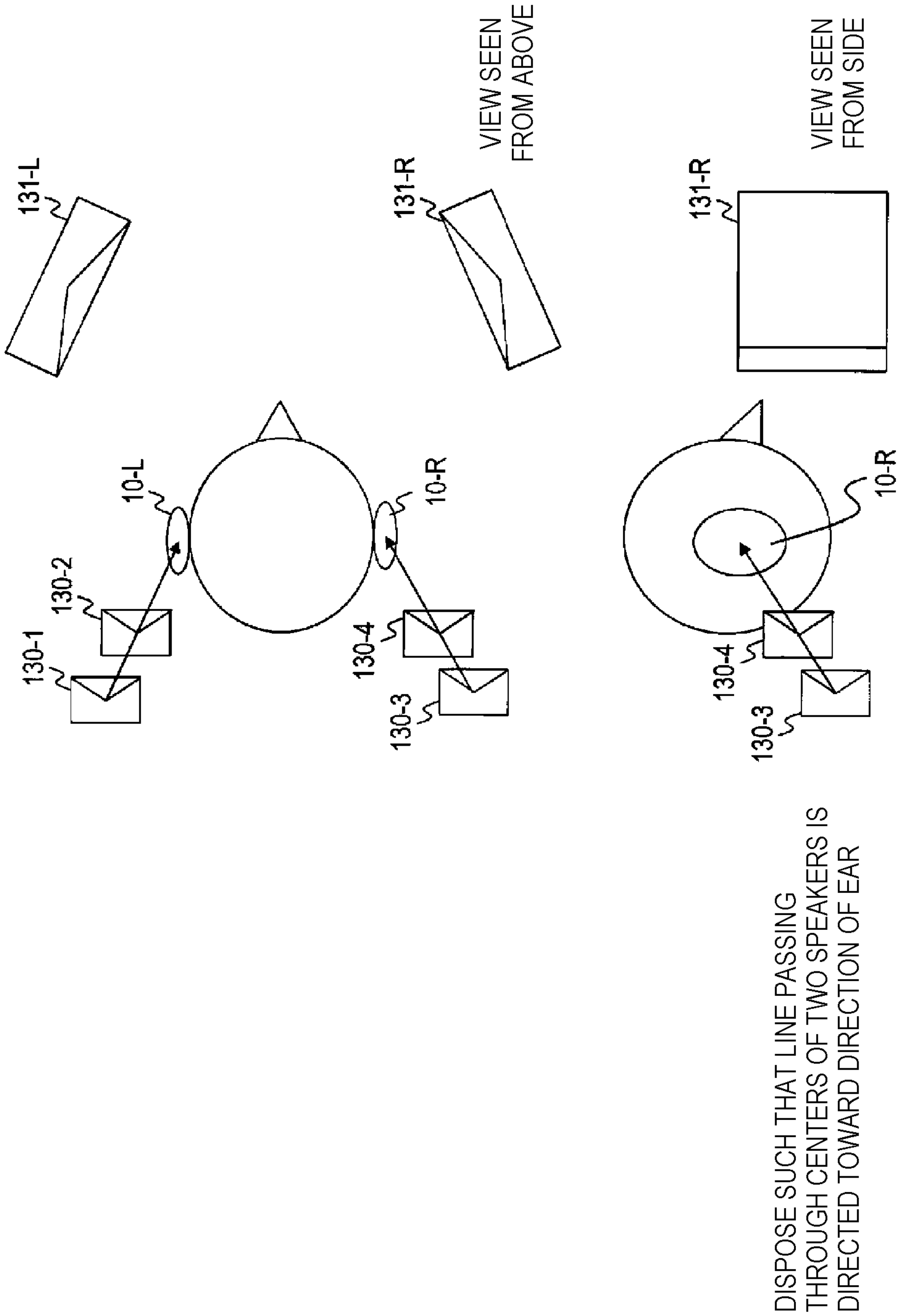
FIG. 9 is a view illustrating an example of the arrangement of the speakers of the first embodiment.
Figure 10:
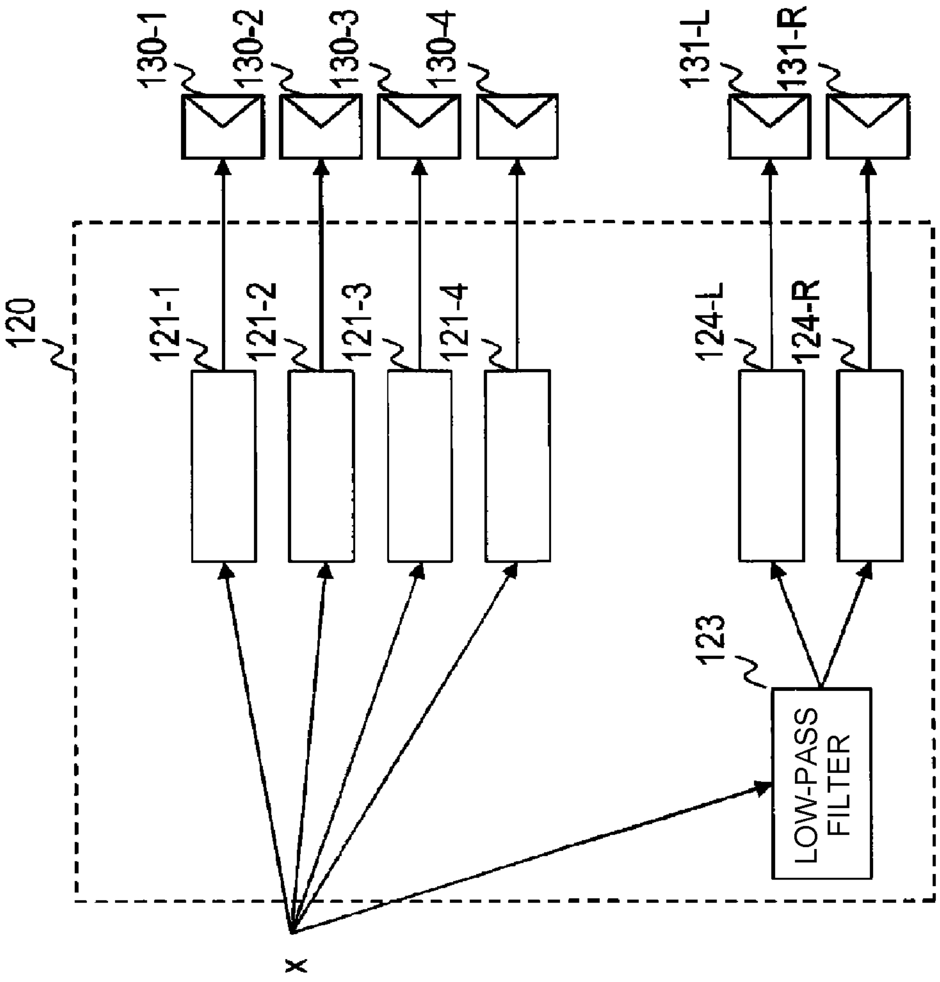
FIG. 10 is a functional block diagram of the control unit according to the first embodiment.

As illustrated in FIG. 9, the control unit 120 may perform control such that low-frequency components, for example, components of 300 Hz or less are reproduced by other speakers 131-R and 131-L with large diameters. In this case, as illustrated in FIG. 10, the control unit 120 includes a low-pass filter 123 and two FIR filters 124-L and 124-R in addition to the configuration in FIG. 7. The control unit 120 filters the acoustic signal x (the input signal of the speakers 131-R and 131-L) by the two FIR filters 124-L and 124-R such that directional characteristics synthesized in the two speakers 131-R and 131-L become stronger toward the direction of the ears 10-L and 10-R. The two acoustic signals after filtering are output to the corresponding speakers 131-R and 131-L, respectively.

Figure 11:
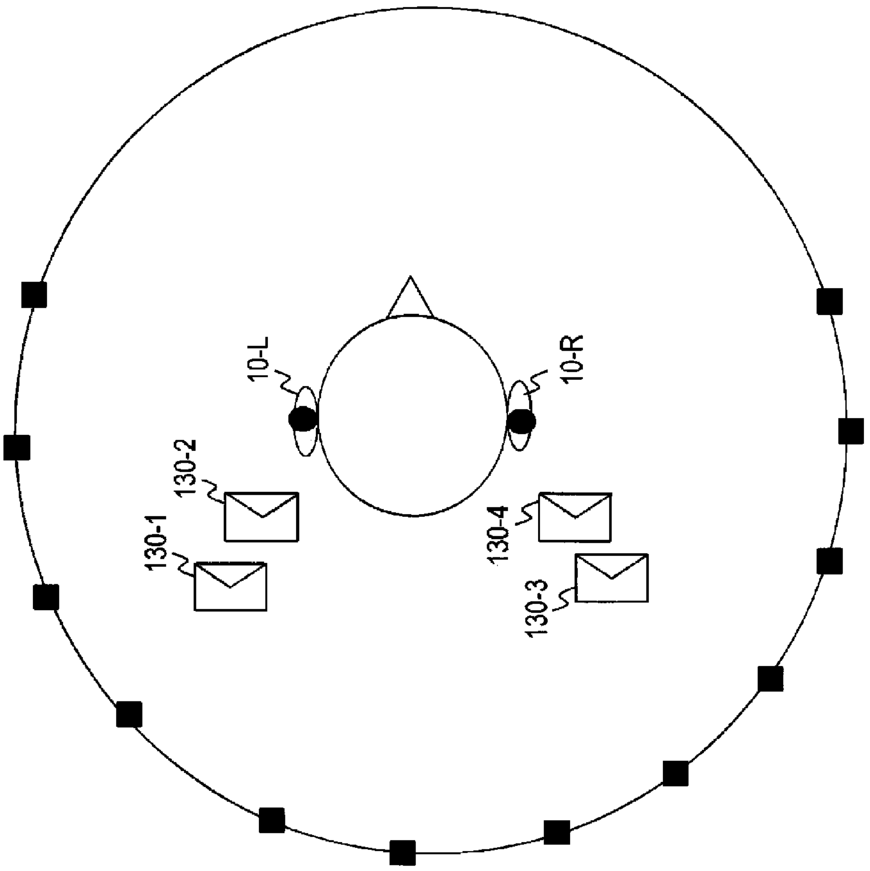
FIG. 11 is a view for describing a method of designing a FIR filter.

A method of designing a FIR filter is described below with reference to FIG. 11.

When there are a transmission characteristic $G_{nj}(\omega)$ from each of the speakers 130-*n* to the positions (the positions of the black dots) of the ears 10-L and 10-R and a transmission characteristic $H_{nk}(\omega)$ from each of the speakers 130-*n* to suppression positions (the positions of the black quadrangles), a filter coefficient $F_n(\omega)$ of the FIR filter is designed such that the transmission characteristic synthesized by the number of N speakers 130-*n* in the positions of the ears 10-L and 10-R becomes 1, and the transmission characteristic synthesized by the number of N speakers 130-*n* in the suppression positions becomes 0. Here, j represents the number of the ear position and includes J positions, and k represents the number of the suppression position and includes K positions. The abovementioned second seat corresponds to any of the suppression positions.

When the above is expressed in expressions, a solution that satisfies a simultaneous equation consisting of a number of J+K expressions below as much as possible only needs to be obtained.

$$\sum_{n=1}^{N} F_n(\omega)G_{nj}(\omega) = 1 \quad j = 1, \ldots , J \qquad \text{[Math. 1]}$$

$$\sum_{n=1}^{N} F_n(\omega)H_{nk}(\omega) = 0 \quad k = 1, \ldots , K \qquad \text{[Math. 2]}$$

For example, the filter coefficient $F_n(\omega)$ can be obtained by a least-squares method and the like.

The transmission characteristic $G_{nj}(\omega)$ from each of the speakers 130-*n* to the positions of the ears 10-L and 10-R (the positions of the black dots) and the transmission characteristic $H_{nk}(\omega)$ from each of the speakers to the suppression positions (the positions of the black quadrangles) may be obtained by simulating the arrival time difference of sound known from the arrangement of the speakers or reflection known from the shape of the space, or may be characteristics actually measured in an anechoic room or a usage environment.

Figure 12:
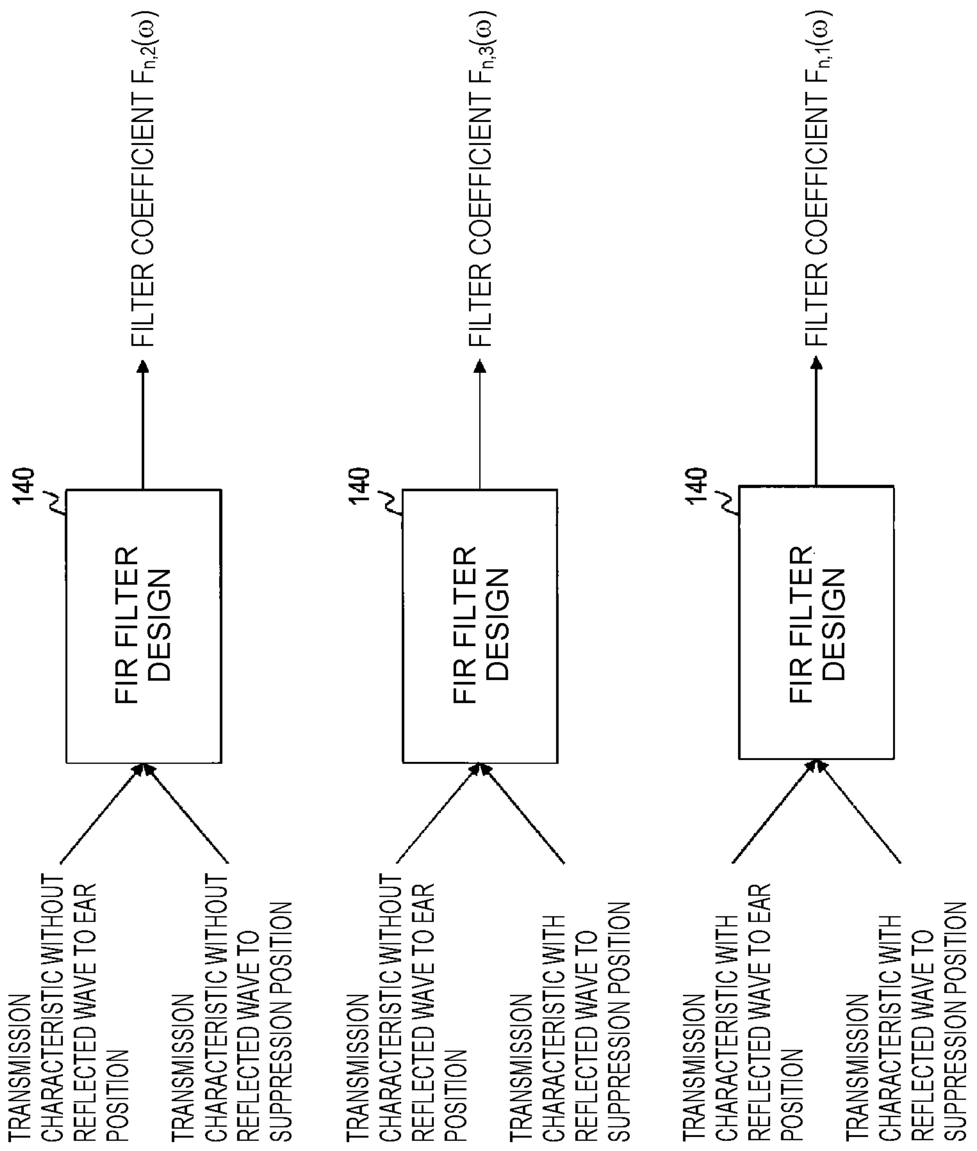
FIG. 12 is a diagram for describing a FIR filter design unit.

Either the transmission characteristic that takes reflection into consideration or the transmission characteristic that does not take reflection into consideration may be used, or a combination of the two transmission characteristics may be used. For example, as illustrated in FIG. 12, a FIR filter design unit 140 may obtain a filter coefficient $F_{n,1}(\omega)$ from the transmission characteristic that takes reflection into consideration, may obtain a filter coefficient $F_{n,2}(\omega)$ from the transmission characteristic that does not take reflection into consideration, or may obtain a filter coefficient $F_{n,3}(\omega)$ from a combination of the transmission characteristic that takes reflection into consideration and the transmission characteristic that does not take reflection into consideration. It is possible to only use any one of those filter coefficients, and those filter coefficients may be used properly in accordance with the situation. For example, the control unit 120 selects a filter coefficient $F_{n,p}(\omega)$ in accordance with the situation from the obtained filter coefficients $F_{n,1}(\omega)$, $F_{n,2}(\omega)$, $F_{n,3}(\omega)$, and sets the filter coefficient $F_{n,p}(\omega)$ to the selected FIR filter 121-*n*. Here, p is any of 1, 2, and 3. For example, the filter coefficient $F_{n,2}(\omega)$ obtained from the transmission characteristic that does not take reflection into consideration is selected when all of windows of an automobile is opened, the filter coefficient $F_{n,1}(\omega)$ obtained from the transmission characteristic that takes reflection into consideration is selected when all of the windows of the automobile are closed, and the filter coefficient $F_{n,3}(\omega)$ obtained from a combination of the transmission characteristic that takes reflection into consideration and the transmission characteristic that does not take reflection into consideration is selected when a part of the windows of the automobile is opened and the rest of the windows is closed. The opening and closing states of the windows only need to be acquired from a sensor that senses the opening and closing states of the windows, for example.

<Effects>

By the configuration above, sound that is easy to hear for the listener can be reproduced, and sound leakage to people other than the listener is reduced.

In the present embodiment, at least two speakers 130-*n* are disposed such that the position of either one of the ears of the user (listener) sitting in the first seat and the center of each of at least two speakers 130-*n* are arranged on one straight line, and hence it is easy to perform setting such that the directional characteristics become strong on the straight line. Reproduction, which is easy to hear for the listener having an ear on the straight line and of which sound leakage is small for other passengers sitting in the other seats, can be realized.

<Other Modified Examples>

The present invention is not limited to the abovementioned embodiment and modified examples. For example, various processing described above is not only executed in chronological order in accordance with the description and may be executed in parallel or individually in accordance with the processing capability of the device that executes the processing or as needed. Other than the above, changes can be made, as appropriate, without departing from the gist of the present invention.

<Program and Recording Medium>

Figure 13:
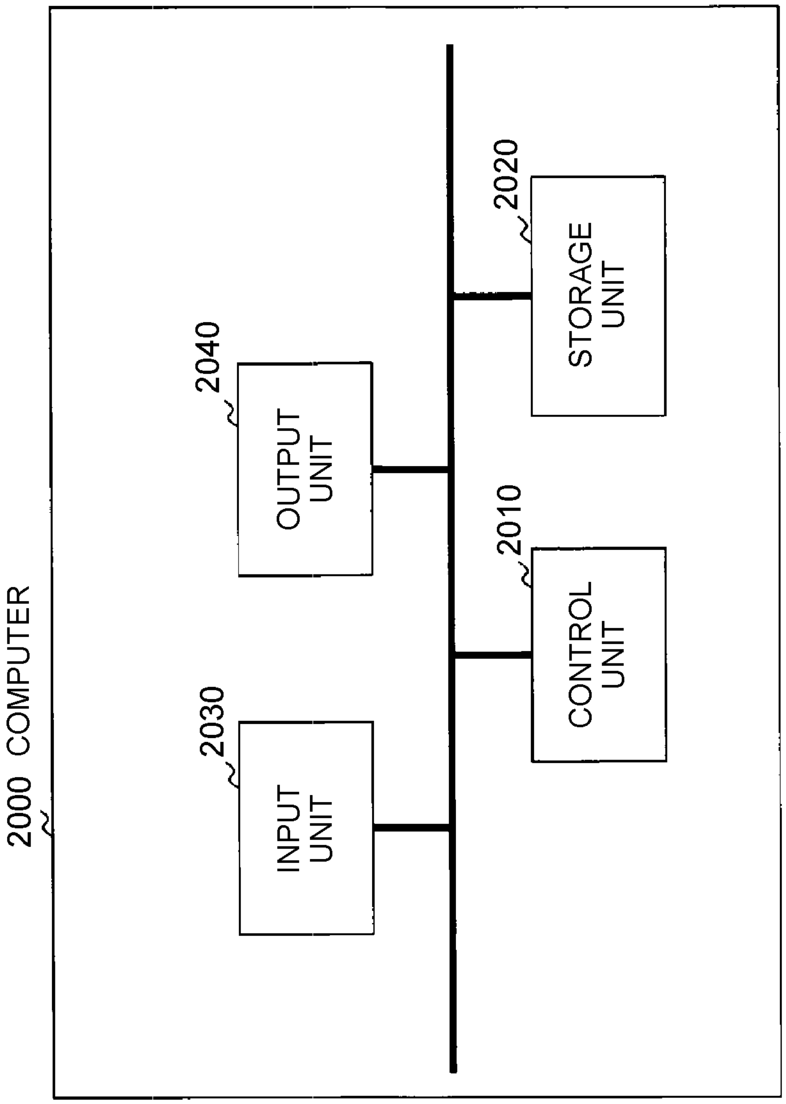
FIG. 13 is a diagram illustrating a configuration example of a computer to which the present approach is applied.

The various processing (the acquisition processing S110 and the control processing S120) described above can be performed by causing a storage unit 2020 of a computer illustrated in FIG. 13 to read a program for executing each step of the abovementioned method, and causing a control unit 2010, an input unit 2030, an output unit 2040, and the like to operate.

The program in which the processing content is described can be recorded in a recording medium readable by the computer. The recording medium readable by the computer may be any medium, for example, a magnetic recording device, an optical disc, a magneto-optical recording medium, or a semiconductor memory.

The distribution of the program is performed, for example, by selling, transferring, or lending, for example, a portable recording medium such as a DVD, a CD-ROM, and the like on which the program is recorded. The program may be stored in a storage device of a server computer, and the program may be distributed by transmitting the program to another computer from the server computer over a network.

The computer that executes the program as above temporarily stores the program recorded on the portable recording medium or the program transmitted from the server computer into a storage device of itself first, for example. When the processing is executed, the computer reads the program stored in the recording medium of itself and executes processing in accordance with the read program. As another execution form of the program, the computer may directly read the program from the portable recording medium and execute processing in accordance with the program. Further, each time a program is transmitted to the computer from the server computer, processing in accordance with the received program may be successively executed. The abovementioned processing may be executed by a so-called application service provider (ASP) service in which transmission of the program from the server computer to the computer is not performed and the processing function is realized by only the execution instruction and result acquisition thereof. The present form includes information (data and the like having a nature of specifying the processing of a computer but is not a direct instruction for the computer) which is provided for processing performed by an electronic computer and which is equivalent to a program.

In the present form, the present device is configured by executing a predetermined program on a computer. However, at least a part of the processing content may be realized in a hardware-like manner.

The reproduction processing S130 can be performed by reproducing an acoustic signal output via the output unit 2040 by a speaker built in or connected to the computer illustrated in FIG. 13.

The invention claimed is:

1. A reproduction apparatus used in a seat, the reproduction apparatus comprising:

at least two speakers; and processing circuitry configured to:

execute an acquisition processing in which the processing circuitry acquires, from a predetermined sound source, an acoustic signal of which sound is emitted by the reproduction apparatus; and execute a control processing in which the processing circuitry controls the acoustic signal acquired by the acquisition processing such that reproduction sound is only transmitted to a first seat and the reproduction sound is not transmitted to a second seat, wherein:

the speakers each emit sound of the acoustic signal controlled by the control processing, the speakers are disposed so as to be closer to an ear of a user that sits in the first seat than to the second seat, the speakers are disposed such that a position of either one of ears of the user that sits in the first seat and centers of the at least two speakers configuring the reproduction apparatus are arranged on one straight line forming a line segment, said either one of ears of the user is located on the extension of the line segment connecting the centers of the two speakers, and the two speakers are disposed so as to face the same direction as a direction that the user is facing, or to face a direction of either one of ears of the user, or to face an upper direction.

2. A reproduction method, implemented by a reproduction apparatus that includes at least two speakers and processing circuitry, the reproduction method being used in a seat, the reproduction method comprising:

an acquisition step in which the processing circuitry acquires, from a predetermined sound source, an acoustic signal of which sound is emitted by each of the speakers; and a control step in which the processing circuitry controls the acoustic signal acquired in the acquisition step such that reproduction sound is only transmitted to a first seat and the reproduction sound is not transmitted to a second seat, wherein:

the speakers each emit sound of the acoustic signal controlled in the control step, the speakers are disposed so as to be closer to an ear of a user that sits in the first seat than to the second seat, the speakers are disposed such that a position of either one of ears of the user that sits in the first seat and centers of the at least two speakers configuring the reproduction apparatus are arranged on one straight line forming a line segment, either one of ears of the user is located on the extension of the line segment connecting the centers of the two speakers, and the two speakers are disposed so as to face the same direction as a direction that the user is facing, or to face a direction of either one of ears of the user, or to face an upper direction.

3. A non-transitory computer-readable recording medium having recorded thereon a program for causing a computer to function as a signal processing device, the computer outputting a signal after signal processing to each of at least two speakers, the program causing the computer to function as:

acquisition means for acquiring, from a predetermined sound source, an acoustic signal of which sound is emitted by each of the speakers; and control means for controlling the acoustic signal acquired by the acquisition means such that reproduction sound is only transmitted to a first seat and the reproduction sound is not transmitted to a second seat, wherein:

the speakers each emit sound of the acoustic signal controlled by the control means, the speakers are disposed so as to be closer to an ear of a user that sits in the first seat than to the second seat, the speakers are disposed such that a position of either one of ears of the user that sits in the first seat and centers of the at least two speakers configuring the reproduction apparatus are arranged on one straight line forming a line segment, either one of ears of the user is located on the extension of the line segment connecting the centers of the two speakers, and the two speakers are disposed so as to face the same direction as a direction that the user is facing, or to face a direction of either one of ears of the user, or to face an upper direction.

* * * * *